SWITCH ASSEMBLY INCLUDING INDICATING MEANS

Original Filed July 13, 1966 2 Sheets-Sheet 1

INVENTOR.
John A. Koepke

BY Michael Forge
Robert W. Beart
His Att'ys

March 31, 1970 J. A. KOEPKE Re. 26,845
SWITCH ASSEMBLY INCLUDING INDICATING MEANS
Original Filed July 13, 1966 2 Sheets-Sheet 2
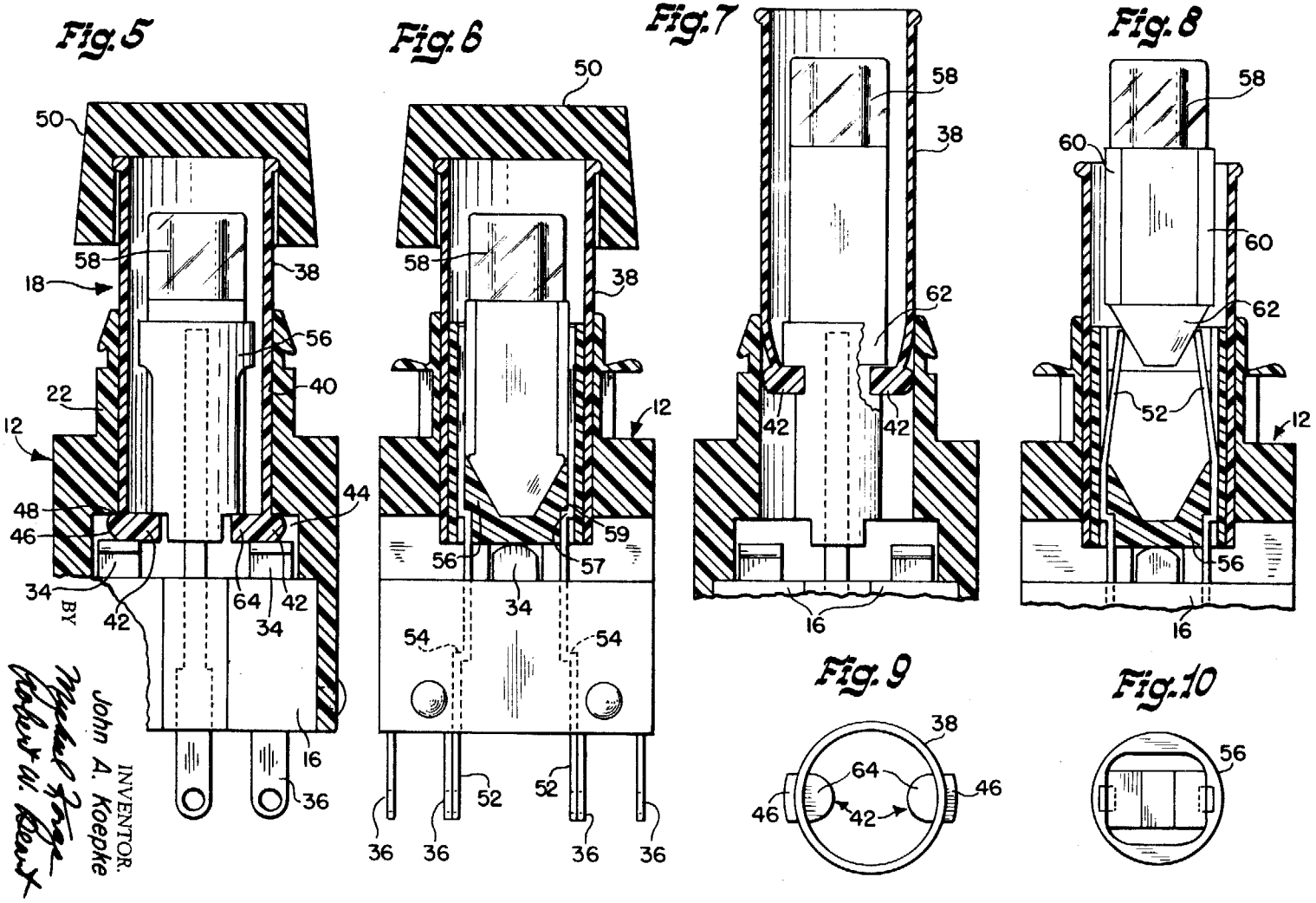
INVENTOR.
John A. Koepke
BY
Michael Forge
Robert W. Beart
His Att'ys United States Patent Office Re. 26,845
Reissued Mar. 31, 1970

26,845

SWITCH ASSEMBLY INCLUDING INDICATING MEANS

John A. Koepke, Mount Prospect, Ill., assignor to Illinois Tool Works Inc., Chicago, Ill., a corporation of Delaware Original No. 3,350,531, dated Oct. 31, 1967, Ser. No. 564,822, July 13, 1966. Application for reissue Nov. 29, 1968, Ser. No. 794,828

Int. Cl. H01h *9/18*

U.S. Cl. 200—167 9 Claims

Matter enclosed in heavy brackets [ ] appears in the original patent but forms no part of this reissue specification; matter printed in italics indicates the additions made by reissue.

ABSTRACT OF THE DISCLOSURE

A lighted push button switch assembly having lamp bulb ejecting features associated therewith to facilitate removal and/or replacement of the lamp bulb relative to the switch assembly.

Lighted push button assemblies are used wherever it is desired to provide a visual indication of the condition of the circuit to which the switch assembly is connected. In today's expanding technology, there are ever increasing uses of lighted push button switch assemblies in a wide variety of situations.

One of the major difficulties encountered in such assemblies is the replacement of the lamp bulbs which give the visual indication desired. The lamp bulbs have a substantially shorter useful life than the other components of the switch assembly, and thus there is a need to replace a lamp bulb in a particular switch assembly one or more times during its life cycle. In lighted push button switch assemblies, the lamps are disposed within the confines of the assembly making it difficult to gain access to the lamp itself even where one or more components are separated from the remainder of the switch assembly. The actual extraction of the lamp from the assembly in prior art devices requires manipulation of the lamp relative to the other parts of the assembly in a relatively confined space, and this is not only burdensome, but it may be relatively difficult to accomplish without the use of a tool or other extraction means in certain instances.

Some problems have also been experienced in mounting lighted push button switch assemblies to an apertured panel. In many cases, it is desirable to remove the switch assembly from the panel in which it is mounted in order to replace defective or worn-out parts. At the same time, it is important to effectively retain the switch assembly in a predetermined position relative to its mounting panel.

The lighted push button switch assembly of the present invention overcomes the above noted deficiencies by both facilitating lamp replacement and enhancing the panel mounting capabilities of the switch assembly as will be described in detail in the discussion that is to follow.

It is one object of the present invention to provide a lighted push button switch assembly which facilitates removal and replacement of the lamp bulb associated therewith.

Another object of the present invention is the provision of an improved lighted push button switch assembly which is capable of self-ejection of the lamp bulb upon disassociation of the push button relative to the other components of the switch assembly.

A further object of the present invention is the provision of a lighted push button switch assembly which, in addition to the aforementioned objects, effectively retains the lamp bulb within the switch assembly until removal thereof is desired and provides good electrical contact between the lamp bulbs and the electrically conductive elements of the switch assembly.

Yet another object of the present invention is the provision of a lighted push button switch assembly which releasably, yet effectively retains the switch assembly in non-rotative locking engagement relative to an apertured panel.

Still a further object of the present invention is the provision of a releasably mounted switch assembly which is simple in construction and easy to assemble and disassemble from an apertured panel.

Yet another object of the present invention is to provide an assembly as described in the foregoing objects which is reliable, has a long field life, is easy to assemble and maintain, and is otherwise well adapted for the purpose for which it is intended.

These and other objects and advantages of the present invention are obtained by the provision of a lighted push button switch assembly which facilitates lamp bulb removal and replacement through the medium of a housing element having at least one switch device incorporating a spring urged actuator mounted thereto, lamp means including a removable bulb mounted to the housing element, and a hollow push button element mounted for relative movement on the housing element with the hollow portion thereof aligned with the lamp means and including a portion for engaging the spring urged actuator of the switch device, the push button being designed to engage and remove the lamp bulb as the push button is withdrawn from the switch assembly. Such a switch assembly also preferably includes means for releasably, yet effectively locking the assembly relative to an apertured panel.

Reference is now made to the drawings wherein:

FIG. 5 is an end elevational view, partly in section, of the switch assembly on a still larger scale, and illustrating the inner confines thereof;

FIG. 6 is a side elevational view, partly in section, on the same scale as FIG. 5, and showing the inner confines of the switch assembly from a different vantage point;

FIG. 7 is a fragmentary end elevational view, partially in section, illustrating the manner in which the lamp bulb is extracted from the switch assembly;

FIG. 8 is a fragmentary side elevational view, partly in section, depicting the lamp bulb after it has been extracted from its lamp socket;

FIG. 9 is a top plan view of the hollow push button element used in conjunction with the switch assembly of the present invention; and FIG. 10 is a top plan view of the lamp socket used with the switch assembly of the present invention.

Figure 1:
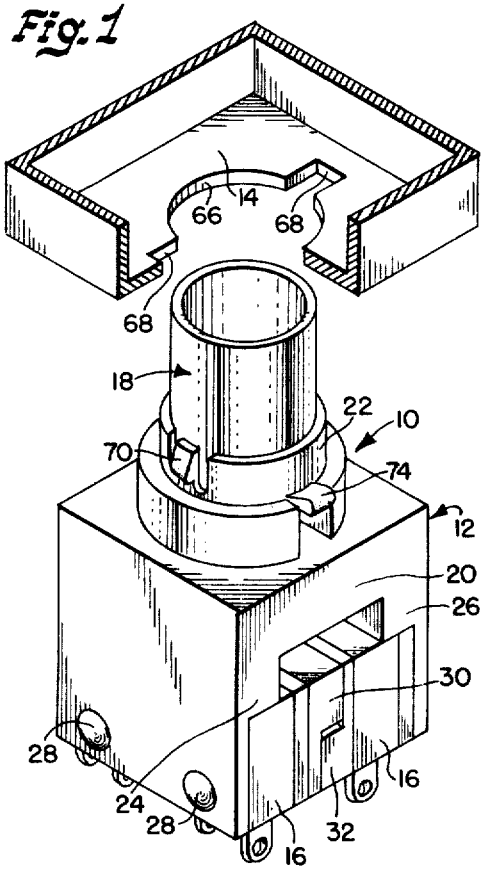
FIG. 1 is an exploded perspective view, partially in section on an enlarged scale showing the push button switch assembly constructed in accordance with the teachings of the present invention prior to its mounting to the apertured panel shown.

Reference is now made to the drawings wherein the various features thereof have been arranged in a prescribed fashion to show the panel mounting features and the bulb removal and replacement aspects of the herein disclosed lighted push button switch assembly. FIGS. 1–4 best illustrated the switch assembly mounting structure while FIGS. 5–10 depict the various components of the lighted push button switch assembly and the manner in which a lamp bulb is removed therefrom.

Considering first the bulb removal and replacement features of the present invention, with reference to FIGS. 1 and 5–10 of the drawings, it will be seen that the switch assembly 10 generally comprises a housing element 12 which is adapted to be mounted to the apertured panel 14 preferably by the mounting structure to be described hereafter, a pair of switch devices 16 mounted at one end of the housing element 12, and a push button/lamp subassembly generally identified by reference numeral 18 which is mounted to the other end of the housing element for operating the switch devices 16 to light and unlight the lamp bulb contained within the subassembly 18.

The housing element 12 has a lower body portion 20 of generally U-shaped configuration, and an upwardly directed hollow stem portion 22 in which the various elements of the push button/lamp subassembly 18 are contained. The U-shaped lower body portion 20 of the housing element includes a pair of depending legs 24, 26 for mounting the switch units 16 thereto by suitable fastening elements 28, such as bolts, rivets or the like. Each of the depending legs 24, 26 have a cut-out portion which is complementary to one side and end wall of the switch unit 16 for accommodating the same therewithin. A pair of mounting blocks 30, 32 are disposed intermediate the two switch units 16, 16 for mounting the terminals of the lamp means as shall later be described.

Each of the switch units 16 is preferably of the type shown in U.S. Patent No. 2,840,657, although it is to be understood that other equivalent switch units may be used in their place. While it is not important for the purposes of the present discussion to understand every detail of the switch devices or units 16, it will be understood that each of the switch devices 16 includes a spring urged actuator buton 34 which opens and closes contact elements contained within the switch device, as shown for example in U.S. Patent No. 2,840,657. The actuator button 34 in each switch device 16 may be biased solely by the contact elements themselves, a supplementary spring means or a combination thereof. Each of the switch devices 16 also includes terminal strips 36 which extend downwardly from the lower face of the switch device and are designed to be connected to electrically conductive wire elements. The actuator button 34 of each switch device 16 is located within an opening of the housing element 16 to permit unimpeded movement thereof along a predetermined axis generally aligned in parallel relationship to the axis of the housing element stem portion 22.

The spring urged actuator 14 of each switch device 16 in the switch assembly is designed to be actuated by a portion of the hollow push button element 38 of the push button/lamp subassembly 18. As best seen in FIGS. 5–6 of the drawings, the hollow push button element 38 is of a predetermined smaller size than the minimum internal dimension of the through passageway 40 extending through the stem portion 22 and a part of the lower body portion 20 of the housing element 12. This will permit the hollow push button element to be readily accepted within the through passageway or bore 40 of the housing element 12. The hollow push button element 38 is provided at its lower free end with resilient foot sections which corresponded in number and location to the spring urged actuators 34 of the switch devices 16. The lower face of each resilient foot section 42 is adapted to engage the upper face of a spring urged actuator 34 so that upon depression of the push element 38, the spring urged actuator button 34 will control the movement of the contact elements contained within a respective switch device 16.

It is to be noted that each resilient foot section 42 projects radially outwardly from the outer periphery of the push button element 38 by an amount sufficient to provide an increased transverse dimension of the push button element 38 relative to the through passageway or bore 40 of the housing element in the vicinity of the resilient foot section. In the embodiment shown in the drawings, the push button element 38 is provided with a pair of diametrically opposed resilient food sections 42, each of which is designed to engage one of the spring urged actuators 34 of the pair of switch devices 16 associated with the switch assembly. When the push button element 38 is inserted within the through passageway or bore 40 of the housing element 12, the resilient foot sections 42 will be cammed or deflected inwardly, in the manner shown in FIG. 7 of the drawings, until the sections are completely moved through passageway or bore 40. Once moved completely through the passageway or bore 40, the resilient foot sections 42 are then moved into an open area 44 of the housing element 12 so that the resilient foot sections 42 can be moved back to their undeflected positions. When this occurs, the outwardly directed portions 46 of the resilient foot section 42 will underlie and engage an internal shoulder 48 provided in the housing element 12 for releasably retaining the push button element 38 relative to the housing element 12 by the snap-action engagement of the resilient foot sections 42 relative to the internal shoulder 48 of the housing element.

When it is desired to remove the push button element 38 from the housing element 12, it is a relatively simple matter to grab the upper end of the push button element and exert an upward pull which will have the effect of causing the outer portions 46 of the resilient foot sections 42 to be cammed inwardly by the internal shoulder 48 of the housing element until a diametrical measurement smaller than the minimum internal dimension of the passageway or bore 40 is achieved to effectuate easy withdrawal of the push button element 38 from the housing element 12. In order to obtain the desired flexing of the foot sections 42, the hollow push button element 38 is preferably made from a plastic material which exhibits the necessary flexibility to achieve the desired ends. Further, the outer portion 46 of each resilient foot section 42 includes upper and lower tapered or cammed faces which will aid in the inward flexing of the foot section 42 during the entrance and removal of the push button element 38 from the housing element 12.

Figure 2:
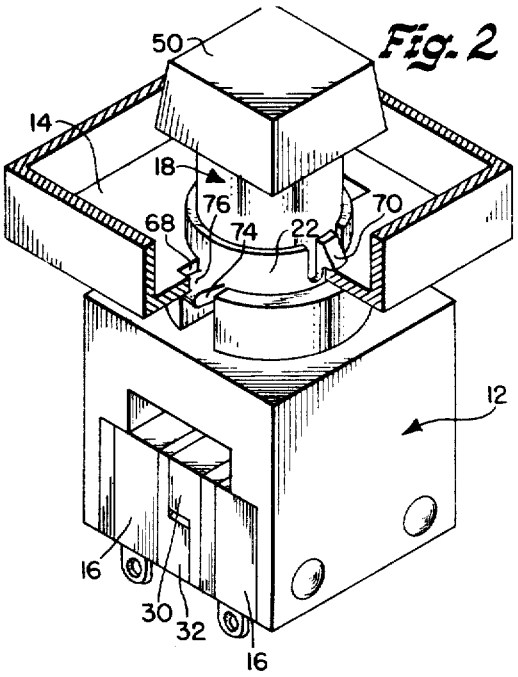
FIG. 2 is a perspective view, partially in section of the switch assembly and apertured panel illustrated in FIG. 1 in assembled position relative to one another.
Figure 3:
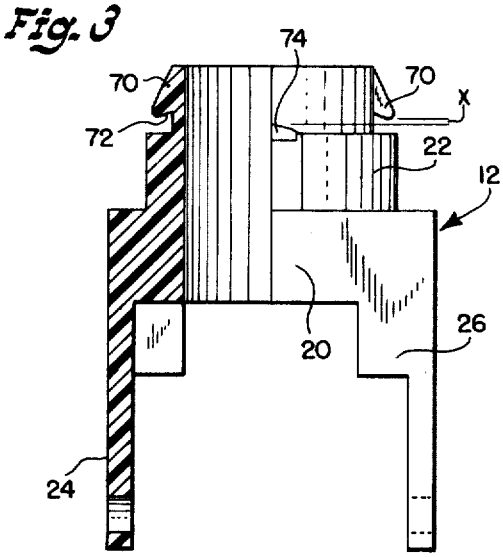
FIG. 3 is a side elevational view, partly in section, of the switch assembly housing element showing part of the mounting structure thereof.
Figure 4:
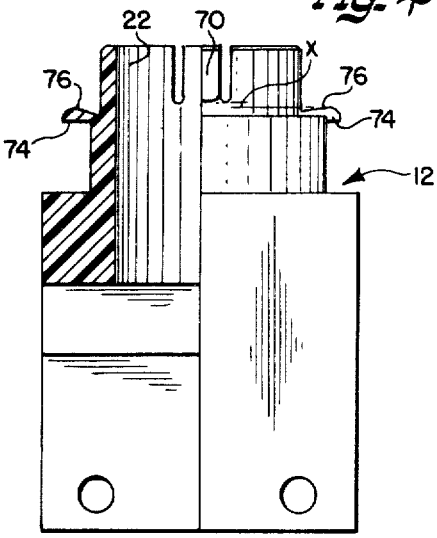
FIG. 4 is also a side elevational view, partly in section, of the switch assembly housing elements showing the remainder of the housing element mounting structure.

The push button element 38 has an elongated shape such that when the resilient foot sections 42 thereof are resting upon the upper face of the spring urged actuators 34 of the switch devices 16 as seen in FIG. 5 of the drawings, the upper end portion of the push button element will project a predetermined distance above the upper end of the stem portion 22. Thus, when the switch assembly is mounted to a panel member as illustrated in FIG. 2, and which will be described in detail hereinafter, the push button 38 will be in a position for engagement thereof by a user of the lighted push button switch assembly. If desired, a plastic cap 50 of a selected color may be positioned on the push button element 38 to provide a color code indication of the circuit with which the lighted push button assembly is associated.

The hollow push button element 38 is designed to reciprocate around the lamp means of the push button/lamp subassembly 18, the hollow portion of the push button, being aligned with the lamp means so that the push button may be actuated independent of and without movement of the lamp means. It has been found that this is a decided advantage in lighted push button switch mechanisms, and this particular feature is disclosed and claimed in U.S. Patent No. 3,118,038.

The lamp means of the push button/lamp subassembly 18 includes a pair of terminal strips 52 which are fixedly mounted to the housing element 12 by the mounting blocks 30, 32 disposed intermediate the pair of switch devices 16 of the switch assembly. In this respect, it is to be noted that the mounting blocks 30, 32 are substantially L-shaped in configuration and are positioned with respect to one another to permit the crook or bend 54 in each of the terminal strips 52 to be captured within a channel defined by the complementary interfitting engagement of the mounting blocks 30, 32. It will be recognized, of course, that the terminal strip 52 may be mounted to the housing element 12 intermediate the switch devices 16 in any suitable manner as will be apparent.

The upper ends of the terminal strips 52 are received within suitable openings of a lamp socket 56 so as to support the lamp sockets in the position shown in FIGS. 5–8 of the drawings. The mounting of the lamp sockets 56 relative to the terminal strips 52 is accomplished by complementary engaging ends or steps 57 of the terminal strips 52 and internal shoulder means 59 formed in the lamp socket 56. Preferably, the lamp socket 56 is made from a moldable plastic material enabling the terminal strips 52 to be molded in place. The upper ends of the terminal strips, as best seen in FIG. 8 of the drawings, are initially biased toward one another within the confines of the lamp socket 56 for purposes which will appear hereinafter.

The lamp socket 56 has an internal wall configuration generally complementary to the lamp bulb to be received thereby. The lamp bulb 58 designed to be accepted by the lamp socket 56 is of the slide base incandescent variety in the sense that it requires no rotation of the bulb relative to the lamp socket to connect the two together. Instead, the lamp bulb 58 includes a pair of contact strips 60 on the outer face thereof which are electrically conductive, and which are designed to engage a pair of terminal elements or the like, such as the terminal strips 52, to provide the desired connection of the lamp bulbs 58 with a selected electrical circuit. The lamp bulb 58 also includes a tapering nose portion 62 having a shape which is complementary to the interior bottom wall area of the lamp socket 56 for reception thereby.

When the lamp 58 is moved into relative interfitting position with respect to the lamp socket 56, the tapered entering end nose portions 62 will engage the inwardly biased upper ends of the terminal strips 52 and will move them to a position clear of the lamp bulb 58 for acceptance of the lamp within the socket 56. The inward bias of the uper ends of the terminal strips 52 will not only provide pressure on the lamp 58 when it is in its installed position within the lamp socket 56, but it will also assure god frictional contact of the terminal strip upper ends with the contact strips 60 of the lamp bulb 58. Upon withdrawal or ejection of the lamp bulb 58 from the lamp socket 56, the uper ends of the terminal strips 52 will also provide a slight ejection force on the lamp bulb, by its engagement with the tapered entering end nose portion 62 thereof, thus assuring complete separation of the lamp bulb 58 from the lamp socket 56.

One of the particularly important features of the present invention is the manner in which the lamp bulb 58 is automatically extracted from the lamp socket 56 as the pushbutton element 38 is withdrawn or disassociated relative to the other elements of the switch assembly. The removal of lamp bulbs from lighted push button switch assemblies has been troublesome due to the difficulty of gaining access to the lamp bulb which is positioned within the confines of the switch assembly. This particular problem has been overcome by the present invention as will now be discussed.

The lamp socket 56 is circumferentially disrupted at various positions coresponding to the location of the resilient foot sections 42 of the hollow push button element 38. In the embodiment shown, the lamp socket 56 has a pair of diametrically opposed openings corresponding to the location of the diametrically opposed resilient foot sections 42 of the push button element 38 so as to expose a portion of the lamp side wall as well as a part of the tapered entering end nose portion 62 of the lamp bulb 58. Each resilent foot section 42 includes an inner shoulder portion or projection 64 which is positioned in a manner to underlie the exposed portions of the tapered entering nose portion 62 when the components of the switch assembly are in their installed position.

The above described structural arrangement will permit the lamp bulb 58 to be withdrawn or extracted from its lamp socket upon a relative disassociating movement of the hollow push button element 38 relative to the other parts of the assembly. In particular, it will be seen in comparing FIGS. 5–6 and FIGS. 7–8 of the drawings, that as the push buttom element 38 is moved from the position shown in FIGS. 5–6 to its position in FIG. 7 of the drawings, the internal shoulder or projection 64 of each resilient foot section 42 will engage the tapered entering end nose portion 62 of the lamp bulb for extracting the lamp from its lamp socket 56. The gripping engagement of the internal shoulder or projection 64 of each resilient foot section 42 will be increased when the foot sections are disposed within the bore or passageway 40 of the housing element 12 due to the inherent flexibility thereof.

It is not necessary to completely remove the hollow push button element 38 from the bore or pasageway 40 of the housing element 12 in order to position the lamp bulb 58 for grasipng thereof. As an alternative approach the push button may be moved to a position such as shown for example in FIG. 7 of the drawings, and then it can be moved downwardly to a position, such as shown for example in FIG. 8 of the drawings, where easy grasping of the lamp bulb 58 is possible. It will be understood that a slight ejection force on the push button element 38 is required in order to initiate removal or disassociation of the push button element 38 relative to the housing element 12, and in this connection, the upper cam face of the outer portion 46 on each resilient foot section 42 will serve to enhance the removal of the push button element 38 due to its camming engagement with the internal shoulder 48 of the housing element 12.

From the foregoing explanation, it will now be appreciated that the present invention contemplates a lighted push button switch assembly wherein the lamp bulb associated therewith is removed for replacement upon relative separating movement of one of the elements of the switch assembly. The assembly provides for actuation of switch devices mounted thereto without movement or disturbance of its lamp means while assuring the necessary frictional and electrical contact of the various elements of the lamp means in the switch assembly.

As a further important feature of the present invention, which may be used with the particular form of lighted push button switch assembly shown in FIGS. 5–10 of the drawings or with similar structure, the switch assembly 10 is capable of being releasably and non-rotatably mounted to an apertured supporting panel. To understand this aspect of the present invention, reference is now made to FIGS. 1–4 of the drawings which best illustrate the mounting structure now to be discussed.

The switch assembly 10 is adapted to be mounted to an apertured supporting panel, such as the panel 14 shown in FIGS. 1–2 of the drawings, which is provided with an appropriately configured opening. For receiving the mounting structure of the switch assembly 10, the panel 14 is provided with a through opening 66 having a maximum diametrical extent greater than the maximum transverse dimension of the hollow stem portion 22. Additionally, the panel 14 includes a pair of diametrically opposed release notches 68 of a predetermined size and shape which intersect the through opening 66 at diametrically opposed points. This form of opening the panel 14 will permit the mounting structure of the switch assembly to function in the manner desired.

The switch assembly mounting structure includes a pair of diametrically opposed, radially outwardly directed resilient tab elements 70 which are disposed on the outer face of the stem portion 22. Each of the resilient tab elements have a size and shape such that they are capable of being received by the diametrically opposed release notches 68 formed in the apertured supporting panels 14. It is important that the tab elements have a transverse dimension exceeding the maximum internal dimension of the through opening 66, in areas distinct from the release notches 68 for resilient gripping engagement of the tab elements 70 with the internal wall surface of the through opening 66. To further supplement the resilient gripping capabilities of the tab elements 70, the lower wall surface 72 is outwardly and downwardly tapered relative to the axis of the stem portion 22 for engaging the top face of the apertured panel surrounding the through opening 66 when the resilient tab elements 70 are moved to a position such as shown in FIG. 2 of the drawings.

While the resilient tab elements 70 will releasably maintain the switch assembly 10 relative to the apertured supporting panel 14, it is possible that vibrations of either the supporting panel 14 or the switch assembly 10 will move the tab element to a position coinciding with the release notches 68 which will cause relative disassociation of the switch assembly and the apertured panel. To resist rotation of the switch assembly when mounted in the apertured supporting panel 10, there is provided a pair of diametrically opposed detent pads 74 which are integral with and extend upwardly from the outer surface of the stem portion 22. The detent pads 74 are both circumferentially as well as axially spaced downward from the resilient tab elements 70, and are configured and arranged to project upwardly into the release notches 68 of the apertured panel 14 to resist rotation of the switch assembly 10. In this respect, each of the detent pads 74 have an upwardly inclined cam surface 76 which will engage the lower face of the apertured supporting panel 14 as the resilient tab elements are moved into engagement with the internal wall surface and surrounding surface portions of the through opening 66. To achieve this, the dimension "x" between the lowermost extremity of the resilient tab elements 70 and uppermost extent of the detent pads 74 is slightly smaller than the thickness of the apertured panel 14 to cause the lower cam face 72 of each resilient tab element 70 and the upper cam face 76 of each detent pads 74 to engage the upper and lower surfaces of the apertured supporting panel 14. Thus, upon rotation of the switch assembly after insertion of the resilient tab elements 70 through the release notches 68, the tab elements 70 will grippingly engage the internal wall and surrounding surface portions of the through opening 66 while the upper cam face 76 will engage the lower surface of the apertured supporting panel until the detent pads are disposed within the release notches 68. When this occurs, the detent pads 74 will be deflected or projected upwardly to a partial extent within the confines of the release notches 68 to resist rotation of the switch assembly 10.

To obtain the desired flexibility and resilient gripping characteristics of the mounting structure, it is preferable that at least the stem portion 22 of the housing elements 12 be formed from a plastic material which will allow yielding or flexing of such portions as the tab element 70 and the detent pads 74. Also, it is preferable, though not necessary, that the detent pads 74 be disposed at a position 90° spaced from resilient tab elements 70 to provide a quarter-turn mounting structure.

In removing the switch assembly 10 from the apertured panel 14, it is a simple matter to depress the push button/lamp subassembly 18 or the stem portion 22 to an extent where the resilient tab elements 70 will yield in an upward direction to permit the detent pads 74 to be removed from the release notches 68 by simple rotation thereof. Once the detent pads 74 are removed from the release notches 68 of the apertured panel 14, it is a simple matter to rotate the assembly until the resilient tab elements 78 are aligned with the release notches whereupon disassociation of the switch assembly 10 from the apertured supporting panel 14 is easily effected as will be apparent.

It will now be appreciated that the present invention also contemplates a novel mounting structure which releasaby, yet non-rotatably mounts the switch assembly to an apertured supporting panel requiring very little expenditure of time and effort in either assembling or disassembling the switch assembly and apertured panel relative to one another.

Although specific embodiments of the invention have been shown and described, it is with full awareness that many modifications thereof are possible. The invention, therefore, is not to be restricted except insofar as is necessitated by the prior art and by the spirit of the appended claims.

What is claimed is:

1. A lighted push button switch assembly comprising, in combination, a housing element having at least one switch device mounted thereto, said switch device including actuator means for opening and closing contact elements contained within said switch device, lamp means including a removable bulb mounted to said housing element, and a hollow push button element mounted for relative movement on said housing element with [a portion thereof disposed in engagement with said actuator means for operating the switch device,] the hollow portion ofsaid push button being aligned with said lamp means whereby said push button may be actuated without movement of said lamp means, said push button including [means] *at least one integral foot section which overlies and engages the actuator means of the switch device, said integral foot section being resiliently attached to said push button and having an outwardly directed portion which provides releasable engagement with an internal shoulder formed in said housing element, said integral foot section also being provided with an inwardly directed portion which underlies at least a portion of the removable bulb* for engaging and removing said removable bulb from said lamp means as the push button element is disassociated relative to the other elements of the switch assembly.

2. The switch assembly as defined in claim 1 wherein said housing element includes integral locking means for releasably securing the switch assembly to an apertured panel.

3. The switch assembly as defined in claim 1 wherein said lamp means includes a lamp socket for receiving the removable bulb and terminal elements mounted relative to said lamp socket for frictionally engaging contact strips provided on the other face of said *removable* bulb.

4. The switch assembly as defined in claim 3 wherein the portions of said terminal elements which engage the contact strips of said *removable* bulb are initially biased toward each other to assure good frictional contact of said terminal elements and said contact strips when the [movable] *removable* bulb and lamp means are assembled to one another while also providing a slight ejection force on the *removable* bulb when removed from the lamp socket.

5. The switch assembly as defined in claim 1 [wherein said hollow push button element includes at least one resilient foot for releasable engagement with an internal shoulder formed in said housing element] *and including a pair of generally opposed resilient foot sections each having inwardly and outwardly directed portions which operate in the manner aforementioned.*

6. The switch assembly as defined in claim [5] *1* wherein [each resilient foot is adapted to overlie and engage the spring urged actuator of the switch device] *the inwardly and outwardly directed portions of each resilient foot section are generally radially aligned with one another.*

7. The switch assembly as defined in claim [6] *3* wherein [each resilient foot also underlies a portion of the removable bulb for ejecting the same upon disassembly of the hollow push button element relative to the housing element] *said lamp socket is mounted within the push button, said lamp socket having at least one longi-*

*tudinal opening therein which is configured and arranged relative to the inwardly directed portion of said integral foot section to permit engagement and removal of said removable bulb from said lamp socket.*

8. The switch assembly as defined in claim 2 wherein said apertured panel is provided with a through opening and a pair of diametrically opposed notches intersecting the through opening, and said integral locking means for releasably securing the switch assembly to the apertured panel comprises a pair of diametrically opposed, radially outwardly directed tab elements provided on said housing element and capable of being received by the diametrically opposed notches of the apertured panel, the maximum transverse dimension of the [resilient] tab elements being greater than the maximum internal dimension of the through opening to cause releasably locking engagement of the tab elements when brought into contact with the internal wall surface surrounding the through opening, said housing element being provided with a pair of detent pads each of which extends radially outwardly from said housing element at a position both circumferentially and axially spaced downwards from a respective tab element, each detent pad being configured and arranged to project upwardly into one of the diametrically opposed panel notches to resist rotation of said switch device relative to said apertured panel.

9. A lighted push button switch assembly comprising, in combination, a housing element having a passageway extending from one end thereof and at least partially therethrough, a switch device mounted to the end of the housing *element* and including a spring urged actuator [locked] *located* within an opening of said housing element formed adjacent to and intersecting the housing *element* passageway, said spring urged actuator being movable along a predetermined axis spaced from and generally aligned in parallel relationship to the axis of the housing *element* passageway for opening and closing contact elements contained within said switch device, lamp means fixed to said housing element and including lamp socket and lamp terminal elements, the lamp socket being positioned within the housing *element* passageway receiving a lamp having contact strips on the outer face thereof, one end of the lamp terminal *elements* being mounted to the lamp socket in exposed relationship on the inner face thereof for engaging the contact strips of the lamp when accepted by the lamp socket, the maximum transverse dimension of the lamp socket being sufficiently smaller than the maximum internal dimension of the housing *element* passageway for the reception of a hollow push button element therebetween, the hollow portion of said push button element being aligned with said lamp means whereby said push button may be actuated without movement of said lamp means, said hollow push button element extending above the housing element and including at least one resiliently deflectable foot element for engaging the spring urged actuator of the switch device for operation thereof, said foot element capable of being moved into underlying engagement relative to an internal shoulder of the housing element for retaining the hollow push button element thereto, [said lamp in the vicinity of the bottom thereof,] *said lamp socket being configured to provide an exposed lamp portion along the length thereof,* and said foot element being arranged relative to said lamp socket and lamp to underlie the exposed portion of the lamp for engaging and retracting said lamp from its lamp socket *along the exposed lamp portion thereof* upon disassociation of the hollow push button element relative to the housing element.

References Cited

The following references, cited by the Examiner, are of record in the patented file of this patent or the original patent.

UNITED STATES PATENTS

| | | | |
|---|---|---|---|
| 2,272,688 | 2/1942 | Catron | 200—168(C) |
| 2,611,843 | 9/1952 | Bourne | 200—167(A) |
| 3,267,245 | 8/1966 | Vincent | 200—167(A) |

HERMAN O. JONES, Primary Examiner